United States Patent [19]
Tarr et al.

[11] Patent Number: 5,935,004
[45] Date of Patent: *Aug. 10, 1999

[54] SYSTEM AND METHOD FOR SCHEDULED DELIVERY OF A SOFTWARE PROGRAM OVER A CABLE NETWORK

[75] Inventors: Jeffrey R. Tarr, Denver; J. Clarke Stevens, Broomfield; Jeffrey C. Lutz, Niwot, all of Colo.

[73] Assignees: MediaOne Group, Inc., Englewood; U S West, Inc., Denver, both of Colo.

[*] Notice: Under 35 U.S.C. 154(b), the term of this patent shall be extended for 581 days.

[21] Appl. No.: 08/520,663

[22] Filed: Aug. 28, 1995

[51] Int. Cl.$^6$ ................................................ A63F 9/22
[52] U.S. Cl. ........................................................ 463/40
[58] Field of Search ............................. 463/29, 42, 40, 463/41; 273/439; 348/6–20; 455/4.2

[56] References Cited

U.S. PATENT DOCUMENTS

| | | |
|---|---|---|
| 4,168,532 | 9/1979 | Dempsey et al. . |
| 4,247,106 | 1/1981 | Jeffers et al. ............................. 463/40 |
| 4,799,677 | 1/1989 | Frederiksen . |
| 5,051,822 | 9/1991 | Rhoades .................................... 463/40 |
| 5,166,886 | 11/1992 | Molnar et al. . |
| 5,251,909 | 10/1993 | Reed et al. ............................... 463/40 |
| 5,283,819 | 2/1994 | Glick et al. . |
| 5,319,705 | 6/1994 | Halter et al. ............................... 380/4 |
| 5,347,304 | 9/1994 | Moura et al. . |
| 5,488,411 | 1/1996 | Lewis . |

FOREIGN PATENT DOCUMENTS

| | | |
|---|---|---|
| 5116063 | 7/1993 | Japan . |
| 7073124 | 3/1995 | Japan . |

*Primary Examiner*—Michael O'Neill
*Attorney, Agent, or Firm*—Brooks & Kushman, PC

[57] ABSTRACT

A system and method for delivering a software program over a cable network includes a head-end server operative to compress a plurality of software programs and transmit the compressed software programs over the cable network at a plurality of corresponding predetermined scheduled times. A primary processor in communication with the cable network receives a selected one of the plurality of software programs at the corresponding predetermined scheduled time, decompresses the program and stores it. A secondary processor in communication with the primary processor includes navigational software and drivers to enable the primary processor to select and receive the software program from the cable network without upstream communication to the head-end server.

17 Claims, 4 Drawing Sheets

Fig. 3

| | 2:00pm | 2:30pm | 3:00pm |
|---|---|---|---|
| 2 line game title | Game A: Episode 1 | | Adventure Games |
| Game B | | | Game C |
| Game C | | | Game A: Episode 1 |

Monday, May 1    Select a Game    1:58 PM

Note: game may be available for more than a 30 minute time period. This box shows a game that is available for 1 hour.

Directional pad moves highlight; A selects highlighted game; Stop goes to Main Menu

SYSTEM AND METHOD FOR SCHEDULED DELIVERY OF A SOFTWARE PROGRAM OVER A CABLE NETWORK

TECHNICAL FIELD

This invention relates to interactive data services for communication networks and, in particular, to the scheduled broadcast of software programs to subscribers over a cable network.

BACKGROUND ART

Prior art video game players are cartridge-based systems wherein individual games are stored on ROM chips within corresponding cartridges. Typical cartridge-based game systems include, for example, Sega Genesis, Super Nintendo, etc. Each game can be played over and again simply by inserting the cartridge in the game player and following the required steps for start-up. These systems suffer, however, in that the cartridges are relatively expensive to make and have limited storage capability. Typical video games cartridges store files on the order of 1–3 megabytes.

In an effort to provide greater game selection at reduced cost, network providers have turned their attention toward the development of interactive data systems whereby video games may be transmitted to subscribers over existing cable networks. Prior art implementations of these systems broadcast game software electronically over coaxial cable plant as well as other broadband wireline and wireless networks. The games are received and stored on DRAM in a device which plugs into a subscriber's game player. Like the prior art cartridge-based systems, however, these network implementations are limited by the storage capability of the DRAM-based storage device which is on the order of 1–3 megabytes. Moreover, because the DRAM is volatile, video games can only be played while the system is powered. Once power is removed, the video game is lost.

A typical prior art network implementation of these DRAM-based systems is the Sega channel which delivers games of 3 megabytes or less. In operation, up to 50 games (totaling approximately 100 megabytes) are broadcast in a continuous stream over the cable network, in a broadcast pattern which repeats approximately every minute. The typical spectrum utilized is 6 MHz. The subscriber is provided with a menu of 50 games which change on a monthly basis and from which the subscriber selects the game he or she wishes to play. The selected game is then downloaded within approximately one minute of selection and stored in DRAM, and played by the subscriber.

While the prior art network implementation works well for the current generation of cartridge-based games, it is entirely ineffective in delivering next-generation CD-ROM-based games which are typically hundreds of megabytes in size (up to 650 megabytes). For example, if 50 next-generation games were sought to be delivered on a continuous basis, thousands of MHz of spectrum would be required. (In contrast, the most advanced cable networks have a total of only 750 MHz of spectrum). With existing hardware, download time would increase from approximately one minute to 5 hours or more and the device which connects to the game player and stores the games in the home would be required to incorporate over 600 megabytes of DRAM at a cost of tens of thousands of dollars. Download time could, of course, be decreased through the use of a high speed modem. To have any appreciable effect, however, such a modem would be required to transmit and receive data at a rate of several thousands of Mbps. The most advanced cable modems presently under commercial development, however, do not exceed 27 Mbps.

Even if these obstacles could be overcome, however, such an implementation would still be subject to the failings of the prior art network systems in that the game would be lost if power were turned off. Moreover, each video game manufacturer would be required to have its own unique device for downloading and storing the game.

In a further attempt to avoid the above-noted problems, designers have sought to utilize massive servers and processors at the cable head-end and use an upgraded broadband digital two-way cable plant to deliver games interactively. Such systems are commonly referred to in the art as virtual CD-ROM approaches. In operation, a small piece of a game is essentially moved from the server to a subscriber set-top box and as the subscriber moves through the game, signals are sent from the set-top box to the server and the next piece of the game is downloaded.

As is readily seen, this approach suffers from many problems as well. Namely, most households (on the order of 70,000,000) have access to a one-way cable plant only. Few consumers have access to two-way cable plants (far less than 10,000). Thus, the approach would require substantial upgrades to the cable plant, head-end equipment and consumer premises equipment costing thousands of dollars per subscriber (approximately $100,000,000.00 per head-end). Even if this feat could be accomplished, however, the existing two-way cable plant is far too slow to deliver the most popular games. As those skilled in the art will recognize, fast twitch action and sports games—which account for approximately 80% of the market—require round-trip latency of 100 milliseconds or less. The existing two-way cable systems, in contrast, have a round-trip latency which is many times that. Still further, each consumer must have access to dedicated bandwidth, greatly limiting the number of simultaneous users. Games would also be required to be significantly rewritten so as to be converted from CD-ROM delivery to electronic delivery. Such rewriting would cause software developers to incur many tens of thousands of dollars in cost and many months of coding and testing for each game title.

Consequently, a need has developed for an improved system and method for delivering video games and other software to network subscribers over a cable network. Such a system should permit fast transmission and easy low cost storage of large data files (on the order 600–650 megabytes) using downstream signaling only. Such a system should not require substantially greater bandwidth than that used by current DRAM-based systems. It should provide for multiple use of a downloaded software and should accommodate multiple application types such as games, shopping, news, etc. Multiple hardware platforms should also be supported as the secondary processor. These platforms should include SEGA, Saturn™, Sony Playstation™, 3DO, MacIntosh, PCs, etc. A catalog of multiple applications should be presented to the customer for potential downloading at scheduled times through a graphical user interface. The cost of the head-end and customer premise equipment should be commercially reasonable. Still further, no cable system network upgrades should be required. Such a system and method should also work with modem speeds that are reasonably attainable with current technology. Moreover, the software delivered should not require a high investment in recoding.

DISCLOSURE OF THE INVENTION

It is thus a general object of the present invention to provide an improved system and method for a subscriber to select and receive a software program from a plurality of software programs transmitted over a cable network at corresponding predetermined scheduled times.

It is a further object of the present invention to provide such an improved system and method for selecting and receiving software programs having file sizes on the order of 600–650 megabytes without sacrificing bandwidth or download time and without requiring expensive network upgrades.

It is a further object of the present invention to provide such an improved system and method which allows for the selection, transmission and storage of software programs using downstream transmission only.

Still further, it is an object of the present invention to provide an improved system and method for selecting and receiving software programs of the type described above which does not require substantially greater bandwidth than that used by current DRAM-based systems and which further permits multiple use by subscribers for multiple applications on multiple game hardware systems and personal computers.

Yet still further, it is an object of the present invention to provide such an improved system and method which is compatible with modem speeds that are reasonably attainable with current technology and which does not require a significant investment in recoding.

In carrying out the above objects and other objects, features and advantages of the present invention, a method is provided for delivering a software program over a cable network to a subscriber. The cable network includes a head-end server located at the cable plant for compressing a plurality of software programs and transmitting the compressed software programs over the cable network at a plurality of corresponding predetermined scheduled times. A primary processor such as a low end PC (386 or 486 chip and motherboard) and hard disk are provided in communication with the cable network. A secondary processor such as a game machine having a game CPU and CD-ROM drive is provided in communication with the primary processor. Operating, i.e., navigation instructions are generated at the secondary processor for receipt by the primary processor so as to enable the primary processor to select and receive one of the plurality of software programs from the cable network without upstream communication to the head-end server. The selected software program is received at the primary processor at the corresponding predetermined scheduled time whereupon it is decompressed and stored.

In a preferred embodiment, broadcast data is transmitted at the head-end server for receipt by the primary processor. The broadcast data corresponds to the predetermined scheduled times the corresponding software programs are available to be received. The broadcast data is converted to executable code, graphic data, sound, etc. at the secondary processor for display on a television or display terminal.

A system is also provided for carrying out the steps of the above-described method. The system includes a head-end server which is located at the cable plant. The head-end server is operative to compress and transmit software programs over the cable network at corresponding predetermined scheduled times. A primary processor is provided in communication with the cable network for receiving a selected one of the plurality of software programs at its corresponding predetermined scheduled time and decompressing and temporarily storing the selected software program. A secondary processor in communication with the primary processor includes navigational software and drivers to enable the primary processor to select and receive the software program from the cable network without upstream communication to the head-end server. The system further includes a television set or display terminal in communication with the secondary processor to display the selected software program.

In a preferred embodiment, the primary processor includes a custom personal computer having a cable modem and a hard disk. Similarly, the secondary processor comprises a video game machine or personal computer which includes a Central Processing Unit (CPU) and a CD-ROM drive. The above-mentioned navigational software and drivers are delivered from a CD-ROM to the secondary processor and from the secondary processor to the primary processor.

The head-end server may also be adapted to transmit broadcast data for receipt by the primary processor. The broadcast data corresponds to the times that the corresponding software programs are available to be received. The secondary processor may also be adapted to include executable code and art for converting the broadcast data to graphic data for display on the television set or display monitor. Still further, the head-end server may be adapted to include encryption means to encode the software program before transmission. Likewise, the secondary processor may be adapted to include decryption means to decode the transmitted software programs upon receipt.

These and other objects, features, and advantages of the present invention are readily apparent from the following detailed description of the best modes for carrying out the invention when taken in connection with the accompanying drawings.

BRIEF DESCRIPTION OF THE DRAWINGS

FIG. 3 is a diagram of the "Select a Game" Screen Display of the user interface of FIG. 2.

BEST MODES FOR CARRYING OUT THE INVENTION

Figure 1:
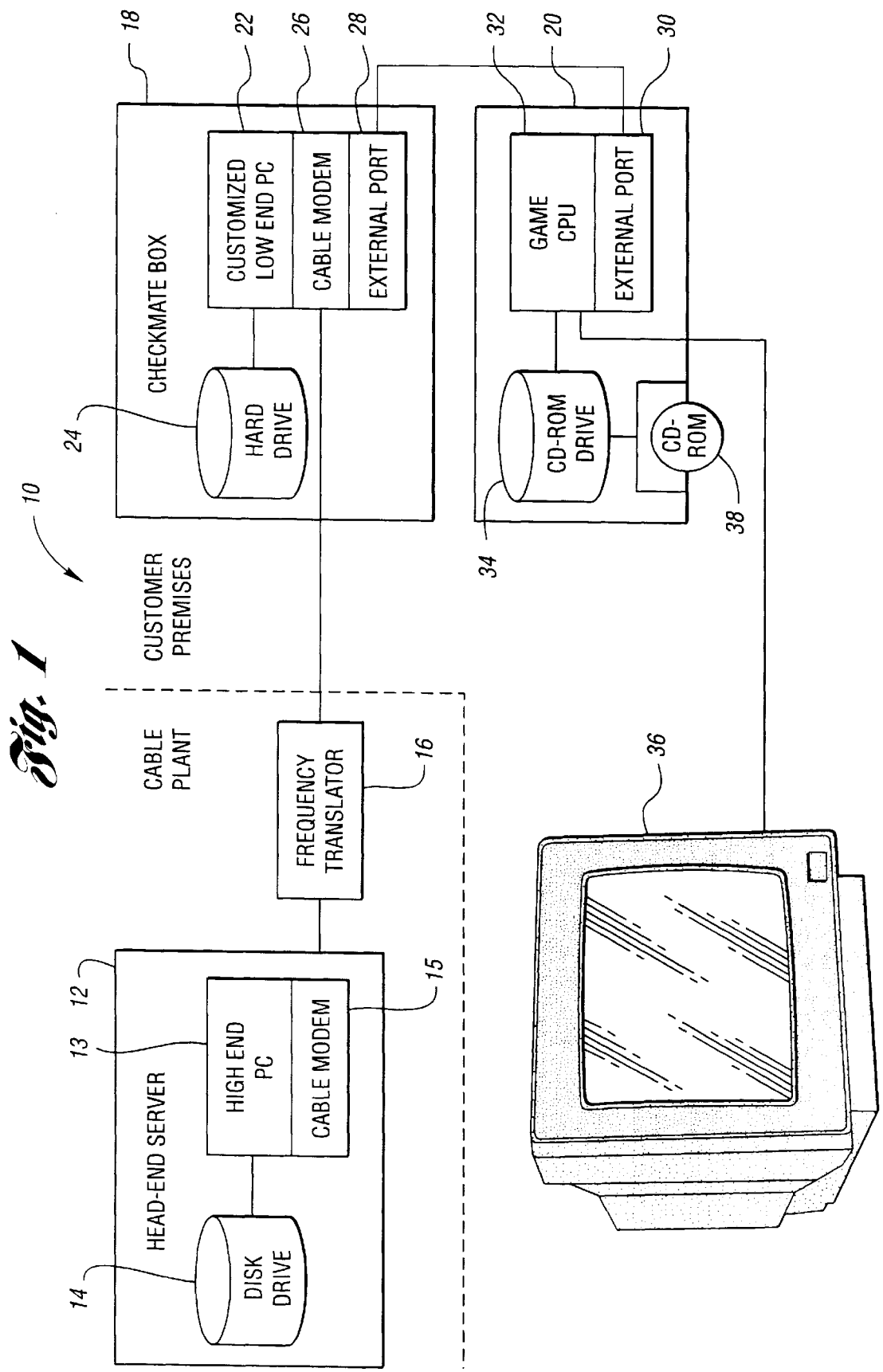
FIG. 1 is a block diagram of the system of the present invention.

Turning now to FIG. 1, there is shown a block diagram of the system of the present invention, designated generally by reference numeral 10. The system 10 includes a head-end server 12 located at the head-end of a cable plant, Direct Broadcast Satellite (DBS) or broadband system. The head-end server 12 transmits software programs such as digitized video, video games, digital audio, or other software programs over the network. The software programs are transmitted in the form of digitally encoded data. Different programs are broadcast at predetermined scheduled times over a bandwidth of approximately 6 MHz (the offering could be expanded by using more spectrum). The head-end server 12 preferably includes a "high end", i.e., high speed processor 13, such as an Intel® Pentium® processor, a disk drive 14 and a cable modem 15.

The system 10 also includes a conventional frequency translator 16 coupled to the head-end server 12. The frequency translator 16 transfers a block of signals occupying a selected frequency band, such as the 6 MHz spectrum occupied by a typical cable television channel, from one position in the frequency spectrum to another. The digital data may be encoded onto an analog cable, e.g., a 75 ohm coaxial cable, in one of several ways, including Quadrature Phase Shift Keying (QPSK), Quadrature Amplitude Modulation (QAM), or Vestigial Sideband (VSB) modulation, etc.

The system 10 further includes a primary processor 18 coupled to the head-end server 12 via the frequency translator 16. The primary processor 18 is located within a subscriber's home or environment. The primary processor 18 receives and demodulates the broadcast and stores the data on a hard disk, thus emulating the CD-ROM drive typically supported by a secondary processor 20. The primary processor 18 preferably includes a "customized low end", i.e., low speed processor 22 such as an Intel® 386 or 486, a hard disk 24, a cable modem 26 and an external port 28. The cable modem 26 communicates with the cable modem 15 of the head-end server 12 via either one-directional or bi-directional communication. The hard disk 24 stores the data received by the cable modem 26 of the primary processor 18 for future use until new data is transmitted and received. The primary processor 18 may also include a built-in smart card reader (not shown) for purchase transactions, a narrow band modem (not shown) to access on-line services and to communicate transactions, and a keyboard (not shown).

The secondary processor 20, also located within a subscriber's home or environment, is in electrical communication with the primary processor 18 via an external port 30 of the secondary processor 20. The electrical communication may be either bus-based or parallel or any other suitable communication that can be supported by secondary processor 20 and primary processor 18. The secondary processor 20 may be a personal computer or any commercially available game machine and includes a game Central Processing Unit (CPU) such as a processor 32 and a disk drive 34, such as a CD-ROM drive. The system 10 further includes a television or display monitor 36 for displaying the video games or software programs to the subscriber. Display 36 is in electrical communication with the secondary processor 20.

To start up the system, the user inserts a start-up CD-ROM 38 into the CD-ROM drive 34. The CD-ROM 38 contains the device drivers and software which enable the PC or video game player to interact with the primary processor 18. The CD-ROM 38 also contains the software which enables the primary processor 18 to select and receive software programs from the head-end server 12. To prevent unauthorized acquisition of the video games and other content, the CD-ROM 38 also contains a program to decrypt the broadcast programs. The CD-ROM 38 may also contain multimedia content (e.g., graphics, animations, video clips and audio clips), software tools, programs (e.g., navigator), and software engines which can be used alone or with data that is broadcast over the network.

The system 10 of the present invention has the advantage of being compatible with a plurality of video game systems that may be purchased by the subscriber such as Sega, Saturn™, Sony, Playstation™, Nintendo Ultra, Atari Jaguar, etc. Thus, the network provider is not required to develop or select and supply a particular video game hardware system. Start-up CD-ROMs 38 are available for each of the various platforms of video game players, e.g., Sega TM, Sony TM, 3DO TM, IBM PC TM, Macintosh TM, etc. The subscriber would need to obtain the CD-ROM 38 corresponding to the platform available at his/her home. The CD-ROM 38 contains the executable code and the art for an electronic program guide for the platform chosen by the subscriber.

The subscriber would then only be able to select programs compatible with his/her video game player.

The head-end server 12 compresses the video games prior to being broadcast over the communications network. Decompression will then occur "on the fly" or on a data block basis on the hard disk 24 of the primary processor 18. The compression/decompression provides greater capacity for the transmission of video games over the cable. Decompression "on the fly" or on a data block basis eliminates the need to accommodate space for simultaneously storing both the compressed and uncompressed data on the hard disk 24.

Small amounts of critical data, including text and graphics, sound, etc., are interleaved with the delivery of video games and other interactive programming so that time critical data does not have to wait until the end of a game transmission. This is important because video game transmissions can take several minutes.

As described above, the software programs delivered by the head-end server 12 are transmitted at predetermined scheduled times. The programming information that needs to be inserted into the electronic program guide is broadcast periodically to inform the subscriber when the program is available for downloading. As time passes and new programs are scheduled, the information about these programs is broadcast and the information in the electronic program guide is updated.

System 10 may also be applied to advertising. The CD-ROM 38 may store a selection of backgrounds, characters, software engines and sounds. The network provider, working with an advertiser, can then broadcast instructions to the primary processor 18 over the communications network to select specific backgrounds, characters, software engines and sounds and create an interactive advertisement while minimizing the time and the spectrum which would otherwise be required to broadcast the advertisement in its entirety. The network provider and the advertiser can further customize the advertisement by broadcasting logos, icons or new art as required.

Figure 4:
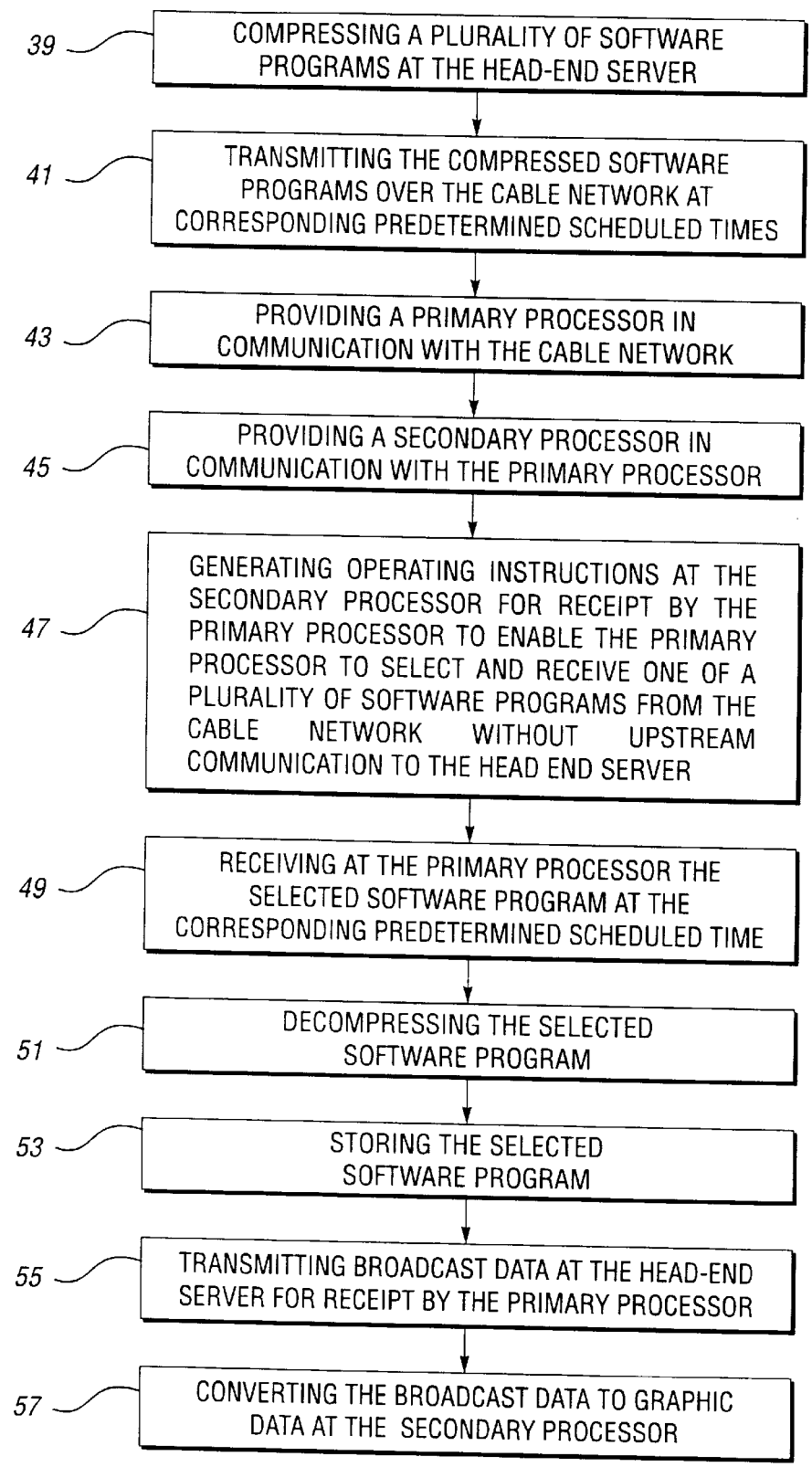
FIG. 4 is a flow diagram of the method steps of the present invention.

Turning now to FIG. 4, the method of the present invention may be more particularly described. As indicated above, the method is specifically directed for delivering a software program to a subscriber over a cable network which includes a head-end server. In operation, a plurality of software programs are compressed 39 at the head-end server and transmitted 41 over the cable network at corresponding predetermined scheduled times. A primary processor comprising, for example, a customized low end PC and hard disk is provided 43 in communication with the cable network. A secondary processor comprising, for example, a game machine which includes a game CPU and CD-ROM drive is provided 45 in communication with the primary processor. Operating instructions are generated 47 at the secondary processor for receipt by the primary processor so as to enable the primary processor to select and receive one of the plurality of software programs from the cable network without upstream communication to the head-end server. The selected software program is thereafter received 49 at the primary processor at the corresponding predetermined scheduled time whereupon it is decompressed 51 and temporarily stored 53.

As discussed above, in a preferred embodiment, the method further comprises transmitting 55 broadcast data at the head-end server for receipt by the primary processor. The broadcast data corresponds to a predetermined scheduled time that the software program is available to be received. Means is further provided at the secondary processor to convert 57 the broadcast data to graphic data for display on a television or monitor. In keeping with the invention, the transmitted software programs are decompressed at the primary processor on a data block basis or on the fly.

The User Interface

Figure 2:
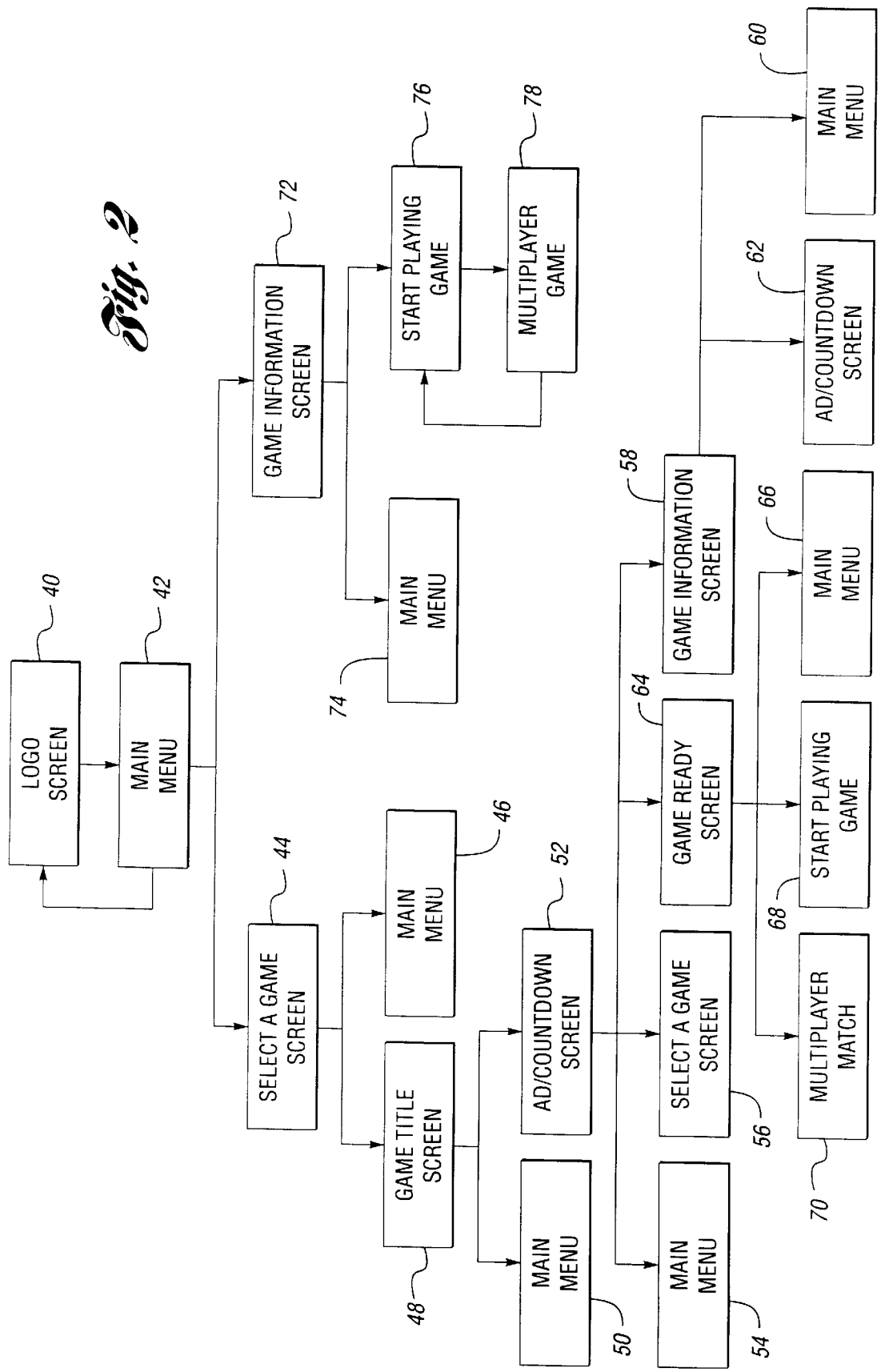
FIG. 2 is a flow diagram of the user interface of the system of FIG. 1.

Turning now to FIG. 2, there is shown a flow diagram of the user interface of the system of FIG. 1. First, as indicated at block 40, a Logo Screen appears on the display 36 after the primary processor 18 is turned on or when the subscriber has the network interface software 38 inserted into the secondary processor 20, even if the primary processor 18 is not turned on.

The Logo Screen transitions to a Main Menu Screen after a predetermined amount of time, e.g., five seconds, or immediately if the subscriber presses a predetermined button on the game controller of the video game player 20, as shown at block 42. The subscriber may make selections using a video game controller coupled to the video game player, such as a mouse, game pad, joystick or keypad. The display 36 displays "buttons" on-screen which are selectable when highlighted. The subscriber preferably has at least three options available at the Main Menu. The subscriber may return to the Logo Screen, select a new game or restart the last game already loaded into the hard disk in the primary processor 18.

If the subscriber selects a new game, the subscriber is presented with a "Select a Game" Screen, as shown at block 44. The "Select a Game" Screen, as shown in FIG. 3, provides the subscriber with at least two options. The subscriber may return to the Main Menu, as shown at block 46, or select a game. The "Select a Game" Screen displays 24 hours worth of listings available to the subscriber. The grid is navigated by scrolling a highlight with the video game controller. The highlighted option may be selected by pressing a predetermined button such as "A" or "Play/Pause" on a video game controller. As shown in FIG. 3, games are offered at 30 minute intervals with three time slots per screen. This interval may, of course, be varied to accommodate user preferences.

As the first listed time slot elapses, the elapsed time slot slides off the screen and a new set of time slots are displayed. The subscriber may thus download any one of the available games during the present time slot. The subscriber may also select a video game to be downloaded at a future time by selecting the appropriate game.

Once the subscriber selects a video game, a "Game Title" Screen appears, as shown at block 48. The "Game Title" Screen displays a description of the game. The subscriber has at least two options. The subscriber may select Stop and return to the Main Menu, as shown at block 50, or confirm the selection and advance to an "Ad/Countdown" Screen, as shown at block 52. The "Ad/Countdown" Screen plays an advertisement on the screen and provides a countdown to when the game will be ready to play.

The subscriber has at least three options at the "Ad/Countdown" Screen. The subscriber may select Stop and return to the Main Menu, as shown at block 54, return to the "Select a Game" Screen, as shown at block 56, or select game information and advance to a "Game Information" Screen, as shown at block 58. The "Game Information" Screen displays various options for selection, such as game instructions, high scores, hints and tips, and lobby arcade. The lobby arcade option allows the subscriber to play one of several preselected games stored on the start up CD-ROM while waiting for his/her selected game to be downloaded to the hard disk. The preselected games may be games such as chess, checkers, etc. The subscriber may then select one of the options, return to the Main Menu, as shown at block 60, or return to the "Ad/Countdown" Screen, as shown at block 62.

Once the game has finished downloading and is ready to be played, a "Game Ready" Screen appears, as shown at block 64. The subscriber may then return to the Main Menu, as shown at block 66, or begin playing the game. If the game is a multi-household game, "Start Playing Game" and "Multiplayer Match" Screen appear, as shown at blocks 68 and 70. In the case of a multi-household game, the game can be played against other players who have the present invention in their home. A remote server connected to the primary processor 18 via a two-way cable network or via the central office of the local telephone network will locate and connect an opponent. Either the subscriber or the interactive network may attempt to locate an opponent. The interactive network may attempt to locate an opponent based on one of several selected criteria, such as same geographic location as the subscriber or same skill level as the subscriber.

Returning to the Main Menu, if the subscriber chooses to restart the last game, the "Game Information" Screen appears, as shown at block 72. The subscriber has the options of returning to the Main Menu or starting the game, as shown at blocks 74 and 76, respectively. As described above, if the game is a multi-household game the "Multiplayer Match" Screen appears, as shown at block 78.

The present invention may also allow the subscriber to order the game. If such an option is available, an "Offer to Buy Game" Screen will appear after the game ends. The "Offer to Buy Game" Screen lists the purchase price of the game, time for delivery and purchase options, such as credit card or smart card. The subscriber may return to the Main Menu or proceed to buy the game. Upon deciding to purchase the game, the subscriber advances to a "Confirmation of Order" Screen that allows the subscriber to confirm the order or return to the Main Menu. The order is communicated by the system via a two-way cable network or via the central office of the local telephone network to a remote server where the order is processed and the item is shipped. An optional "Billing Information" Screen may be displayed to the subscriber to indicate the current charge and a new balance, if any.

The advantages of the present invention are numerous. The present invention supports cost effective and convenient (for the subscriber and the network provider) distribution of large amounts of data. The present invention also uses limited bandwidth on analog cable thereby eliminating expensive cable network upgrades. Furthermore, the present invention allows the network provider to deliver software written for video game and personal computer systems with minimal changes to the software/title as used in a stand-alone environment, i.e., addition of a wrapper, encryption, etc. Still further, the present invention is compatible with various video game systems available for purchase.

While the best modes for carrying out the invention have been described in detail, those familiar with the art to which this invention relates will recognize various alternative designs and embodiments for practicing the invention as defined by the following claims.

What is claimed is:

1. A system for delivering a software program over a cable network to a subscriber, comprising:

a head-end server operative to compress a plurality of software programs and transmit the compressed software programs over the cable network at a plurality of corresponding predetermined scheduled times;

a primary processor in communication with the cable network for receiving a selected one of said plurality of software programs at said corresponding predetermined scheduled time and decompressing and storing the selected software program until a second selected one of said plurality of software programs is transmitted and received; and a secondary processor in communication with the primary processor, the secondary processor including navigational software and drivers to enable the primary processor to select and receive the software program from the cable network without upstream communication to the head-end server.

2. The system of claim 1, wherein the primary processor comprises a low end processing chip, a motherboard, a cable modem, and a hard disk.

3. The system of claim 1, wherein the secondary processor comprises a game machine which includes a Central Processing Unit (CPU) and a game player.

4. The system of claim 3, wherein the secondary processor includes a CD-ROM drive operative to play a start-up CD-ROM containing the navigational software and drivers.

5. The system of claim 3, further comprising a display monitor in communication with the CPU.

6. The system of claim 3, further comprising a television set in communication with the CPU.

7. The system of claim 1, wherein the head-end server is operative to transmit broadcast data for receipt by the primary processor, the broadcast data corresponding to a predetermined scheduled time the software program is available to be received.

8. The system of claim 7, wherein the secondary processor further includes executable code and art for converting the broadcast data to graphic data for display on a television or monitor.

9. The system of claim 8, wherein the secondary processor includes a CD-ROM drive operative to play a start-up CD-ROM containing the operating software, drivers, executable code and art.

10. The system of claim 1, wherein the head-end server includes encryption means to encode the software program before transmission and the secondary processor includes decryption means to decode the transmitted software program upon receipt.

11. A system for delivering a video game over a cable network to a subscriber, comprising:

a head-end server operative to compress a plurality of video games and transmit the compressed video games over the cable network at corresponding predetermined scheduled times;

a primary processor in communication with the cable network for receiving a selected one of said plurality of video games at said corresponding predetermined scheduled time and decompressing and temporarily storing the selected video game until a second selected one of said plurality of software programs is transmitted and received;

a monitor; and a video game machine in communication with the primary processor and the monitor, the video game machine including a Central Processing Unit (CPU) and a game player containing operating software and drivers to enable the primary processor to select and receive the video game from the cable network without upstream communication to the head-end server.

12. The system of claim 11, wherein the head-end server is operative to transmit broadcast data for receipt by the primary processor, the broadcast data corresponding to a time the video game is available to be received.

13. The system of claim 12, wherein the game player further includes executable code and art for converting the broadcast data to graphic data for display on the video monitor.

14. The system of claim 11, wherein the game player includes a CD-ROM drive adapted to play a start-up CD-ROM containing the navigational software and drivers.

15. The system of claim 13, wherein the game player includes a CD-ROM drive adapted to play a start-up CD-ROM containing the navigational software, drivers, executable code and art.

16. The system of claim 11, wherein the head-end server includes encryption means to encode the software program before transmission and the game player includes decryption means to decode the transmitted software program upon receipt.

17. The system of claim 11, wherein the monitor is a television.

* * * * *